United States Patent
Adachi et al.

(10) Patent No.: US 10,984,819 B2
(45) Date of Patent: Apr. 20, 2021

(54) MAGNETIC TAPE RECORDING DEVICE INCLUDING CARTRIDGE MEMORY HAVING A PLURALITY OF MEMORY BANKS

(71) Applicant: Sony Corporation, Tokyo (JP)

(72) Inventors: Naohiro Adachi, Tokyo (JP); Eiji Nakashio, Miyagi (JP); Kazuo Anno, Miyagi (JP); Shinya Tochikubo, Miyagi (JP); Minoru Yamaga, Miyagi (JP); Takanobu Iwama, Miyagi (JP); Masayoshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/620,756

(22) PCT Filed: Feb. 8, 2019

(86) PCT No.: PCT/JP2019/004706
§ 371 (c)(1),
(2) Date: Dec. 9, 2019

(87) PCT Pub. No.: WO2019/198323
PCT Pub. Date: Oct. 17, 2019

(65) Prior Publication Data
US 2021/0027803 A1    Jan. 28, 2021

(30) Foreign Application Priority Data
Apr. 9, 2018    (JP) .............................. JP2018-075070

(51) Int. Cl.
*G11B 5/584*    (2006.01)
*G11B 5/008*    (2006.01)
(Continued)

(52) U.S. Cl.
CPC ...... *G11B 5/00813* (2013.01); *G06F 11/1076* (2013.01); *G11B 20/1803* (2013.01);
(Continued)

(58) Field of Classification Search
None
See application file for complete search history.

(56) References Cited

U.S. PATENT DOCUMENTS 6,571,304 B1 *    5/2003    Basham .............. G06F 3/0617
                                                   360/132
6,614,610 B1 *    9/2003    Takayama ........... G06F 3/0613
                                                   360/69
(Continued)

FOREIGN PATENT DOCUMENTS

JP    2002-189994        7/2002
JP    2002-189994 A      7/2002
(Continued)

OTHER PUBLICATIONS

International Search Report and Written Opinion issued in connection with PCT/JP2019/004706, dated Apr. 2, 2019. (6 pages).

*Primary Examiner* — Tan X Dinh
(74) *Attorney, Agent, or Firm* — K&L Gates LLP (57) ABSTRACT

A cartridge memory used for a tape cartridge includes: a communication unit that communicates with a recording and reproducing device using a wireless communication method defined by an ISO 14443-2 standard which is a wireless communication standard; a non-volatile memory with a storage capacity exceeding 16 KB; and a control unit that writes or reads data to or from the non-volatile memory on a word-by-word basis (2 bytes at a time) or on a block-by-block basis (32 bytes at a time). The non-volatile memory includes a plurality of memory banks each having a storage capacity of 128 KB or less. The control unit writes or reads data defined by a magnetic tape standard to or from one or
(Continued)

two or more first memory banks among the plurality of the memory banks, and writes or reads additional data to or from one or two or more second memory banks other than the first memory bank.

13 Claims, 8 Drawing Sheets

(51) Int. Cl.
- G11B 20/18 (2006.01)
- G06F 11/10 (2006.01)
- H04L 29/08 (2006.01)
- G11B 5/588 (2006.01)

(52) U.S. Cl.
CPC .......... G11B 20/1833 (2013.01); *G11B 5/584* (2013.01); *G11B 5/588* (2013.01); *H04L 67/1097* (2013.01)

(56) References Cited

U.S. PATENT DOCUMENTS

| | | | | |
|---|---|---|---|---|
| 6,621,650 | B1 * | 9/2003 | Takayama | G11B 5/0086 |
| | | | | 360/48 |
| 6,947,237 | B2 * | 9/2005 | Christie, Jr. | G11B 23/042 |
| | | | | 360/48 |
| 7,929,236 | B2 * | 4/2011 | Katagiri | G11B 5/00817 |
| | | | | 360/48 |
| 8,873,184 | B2 * | 10/2014 | Sato | G11B 23/042 |
| | | | | 360/55 |
| 10,796,724 | B1 * | 10/2020 | Nakashio | G11B 23/04 |
| 2013/0044386 | A1 | 2/2013 | Sato | |

FOREIGN PATENT DOCUMENTS

| | | |
|---|---|---|
| JP | 2003-109353 | 4/2003 |
| JP | 2013-041646 | 2/2013 |
| JP | 2013-041646 A | 2/2013 |

\* cited by examiner

MAGNETIC TAPE RECORDING DEVICE INCLUDING CARTRIDGE MEMORY HAVING A PLURALITY OF MEMORY BANKS

TECHNICAL FIELD

The present disclosure relates to a cartridge memory, a tape cartridge, and a recording and reproducing system.

BACKGROUND ART

Magnetic recording media are widely used for storage of electronic data. In particular, magnetic tapes having low cost per data unit capacity have regained attention and are utilized in data centers and the like together with hard disk drives (HDDs) as recording media used in cloud storage services.

Magnetic tapes conforming to the Linier Tape Open (LTO) Ultrium standard are in widespread use as the magnetic tapes. A non-contact non-volatile memory using RF wireless communication called a cartridge memory (CM) is embedded in a tape cartridge conforming to the LTO Ultium standard (see, for example, Patent Document 1). Information such as manufacturing information, drive usage history, and vendor-specific management information are written to the cartridge memory, for example. The usage of the cartridge and the like can be checked in a short time by loading the cartridge into a drive and then the drive reading the above information from the cartridge memory.

As the storage capacity of the magnetic tape conforming to the LTO standard increases, the storage capacity of the cartridge memory needs to be increased. This is because the amount of information written to the cartridge memory increases in accordance with the storage capacity of the magnetic tape.

CITATION LIST

Patent Document

Patent Document 1: Japanese Patent Application Laid-Open No. 2003-109353

SUMMARY OF THE INVENTION

Problems to be Solved by the Invention

However, the Liner Tape Open Generation 8 (LTO-8) or IBM 3592 standard specifies the storage capacity of the cartridge memory to be 16 KB. Thus, if the storage capacity of the cartridge memory is increased to exceed 16 KB in accordance with the increase in the information written to the cartridge memory, there is a possibility that compatibility with the above existing standards is lost.

An object of the present disclosure is to provide a cartridge memory, a tape cartridge, and a recording and reproducing system that can improve the storage capacity while maintaining compatibility with an existing standard.

Solutions to Problems

In order to solve the above problem, a first disclosure is a cartridge memory used for a tape cartridge, including: a communication unit that communicates with a recording and reproducing device using a wireless communication method defined by an ISO 14443-2 standard which is a wireless communication standard;
a non-volatile memory with a storage capacity exceeding 16 KB; and
a control unit that writes or reads data to or from the non-volatile memory on a word-by-word basis (2 bytes at a time) or on a block-by-block basis (32 bytes at a time), in which
the non-volatile memory includes a plurality of memory banks each having a storage capacity of 128 KB or less,
the control unit writes or reads data defined by a magnetic tape standard to or from one or two or more first memory banks among the plurality of the memory banks, and
additional data is written or read to or from one or two or more second memory banks other than the first memory bank.

A second disclosure is
a cartridge memory used for a tape cartridge, including:
a communication unit that communicates with a recording and reproducing device using a wireless communication method defined by an ISO 14443-2 standard which is a wireless communication standard;
a non-volatile memory with a storage capacity exceeding 16 KB; and
a control unit that writes or reads data to or from the non-volatile memory on a block-by-block basis (32 bytes at a time), in which
the non-volatile memory includes a plurality of memory banks each having a storage capacity of 2 MB or less,
the control unit writes or reads data defined by a magnetic tape standard to or from one or two or more first memory banks among the plurality of the memory banks, and
additional data is written or read to or from one or two or more second memory banks other than the first memory bank.

Effects of the Invention

According to the present disclosure, the storage capacity can be improved while maintaining compatibility with an existing standard. Note that the present disclosure may have an effect not necessarily limited to the one described herein but any effect described in the present disclosure or an effect different therefrom.

MODES FOR CARRYING OUT THE INVENTION

Embodiments of the present disclosure will be described in the following order. Note that in all the drawings of the following embodiments, parts that are identical or correspond to each other will be assigned the same reference numeral.

1 First embodiment (example of recording and reproducing system)
2 Second embodiment (example of recording and reproducing system)
3 Third embodiment (example of recording and reproducing system)
4 Fourth embodiment (example of recording and reproducing system)
5 Variation

1 First Embodiment

[Configuration of Recording and Reproducing System]

Figure 1:
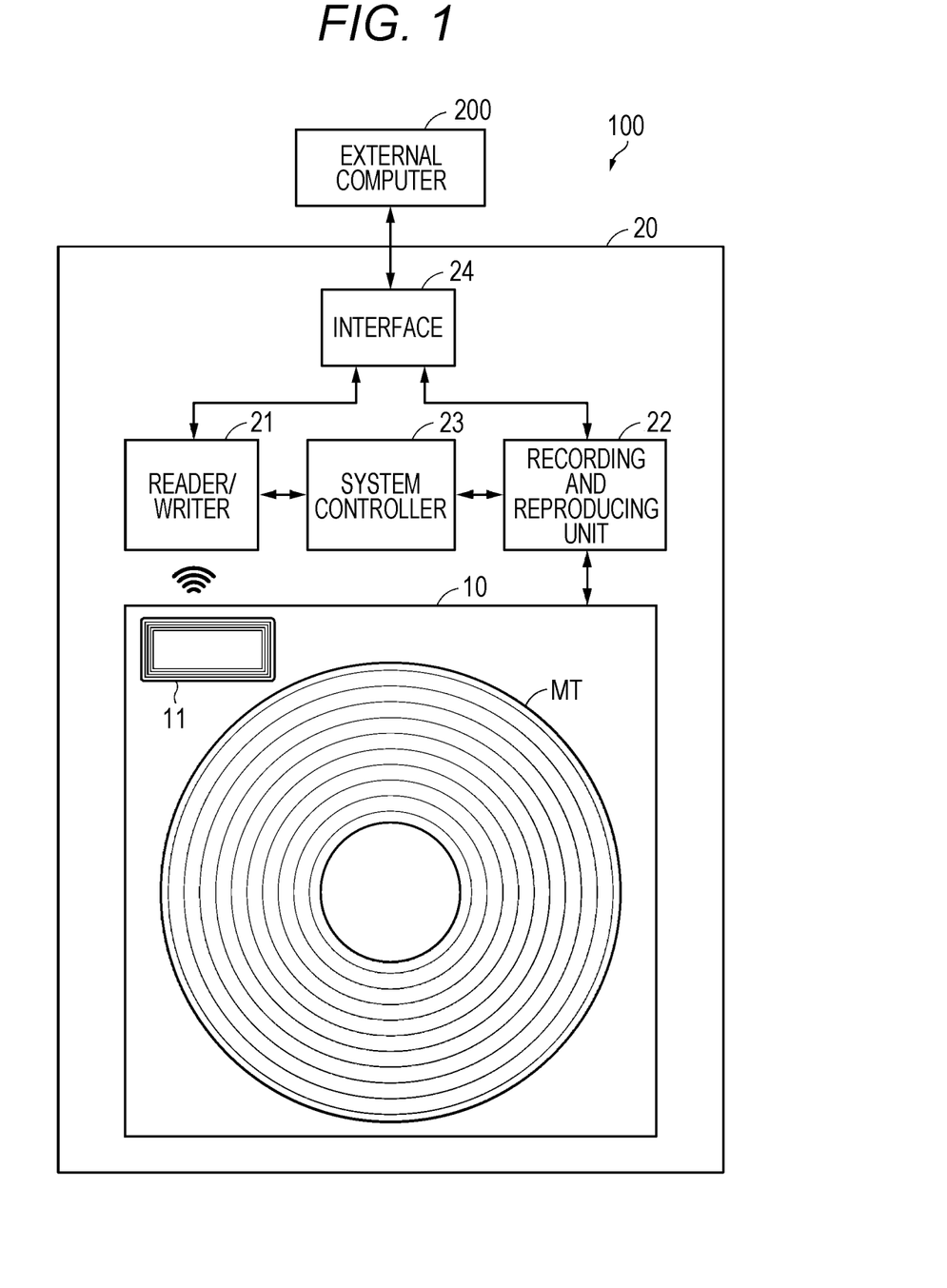
FIG. 1 is a schematic diagram of a recording and reproducing system according to a first embodiment of the present disclosure.

As illustrated in FIG. 1, a recording and reproducing system 100 according to a first embodiment of the present disclosure includes a tape cartridge 10 having a magnetic tape MT and a cartridge memory 11, and a recording and reproducing device (drive) 20 that can load and unload the tape cartridge 10.

(Recording and Reproducing Device)

The recording and reproducing device 20 includes a reader/writer 21 as a communication unit, a recording and reproducing unit 22, a system controller 23 as a control unit, and an interface 24. The recording and reproducing device 20 is connected to an external computer 200 via the interface 25.

The reader/writer 21 communicates with the cartridge memory 11 using a wireless communication method defined by the ISO 14443-2 standard which is a wireless communication standard. The recording and reproducing unit 22 includes a drive unit (not shown) for running the magnetic tape MT, a head unit (not shown), and the like, and performs recording and reproducing of data on the magnetic tape MT.

The system controller 23 controls each unit of the recording and reproducing device 20 such as the reader/writer 21, and the recording and reproducing unit 22. The system controller 23 includes a central processing unit (CPU), a read only memory (ROM), a random access memory (RAM), and the like not shown.

The interface 24 is connected to the recording and reproducing unit 22 and the external computer 200. A signal read from the magnetic tape MT by the recording and reproducing unit 22 is output to the external computer 200 via the interface 24. On the other hand, a signal to be recorded on the magnetic tape MT by the recording and reproducing unit 22 is supplied from the external computer 200 via the interface 24.

The interface 24 may be connected to the reader/writer 21. In this case, the reader/writer 21 can be controlled by an operation input from the external computer 200 connected to the interface 24.

(Tape Cartridge)

Figure 2:
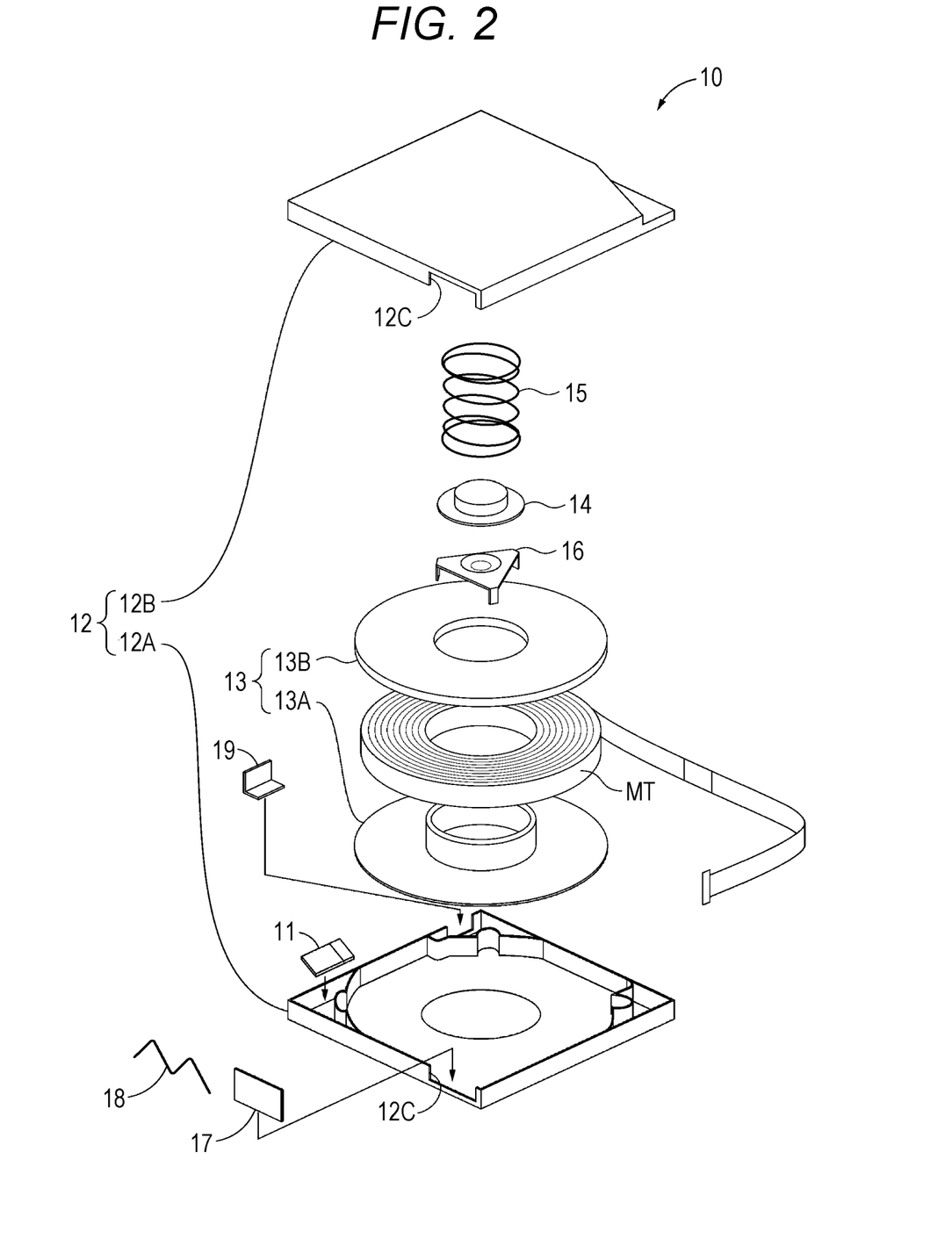
FIG. 2 is an exploded perspective view of a tape cartridge.

The tape cartridge 10 is a tape cartridge conforming to the so-called LTO standard or IBM standard and as illustrated in FIG. 2 includes, inside a cartridge case 12 including a lower shell 12A and an upper shell 12B, a reel 13 around which the magnetic tape MT is wound, a reel lock 14 and a reel spring 15 for locking the rotation of the reel 13, a spider 16 for unlocking the reel 13, a slide door 17 for opening and closing a tape outlet 12C provided in the cartridge case 12 across the lower shell 12A and the upper shell 12B, a door spring 18 for urging the slide door 17 to a closed position of the tape outlet 12C, a write protection 19 for preventing accidental erasure, and the cartridge memory 11. The reel 13 has a substantially disk shape with an opening at the center, and includes a reel hub 13A and a flange 13B made from hard material such as plastic.

Figure 3:
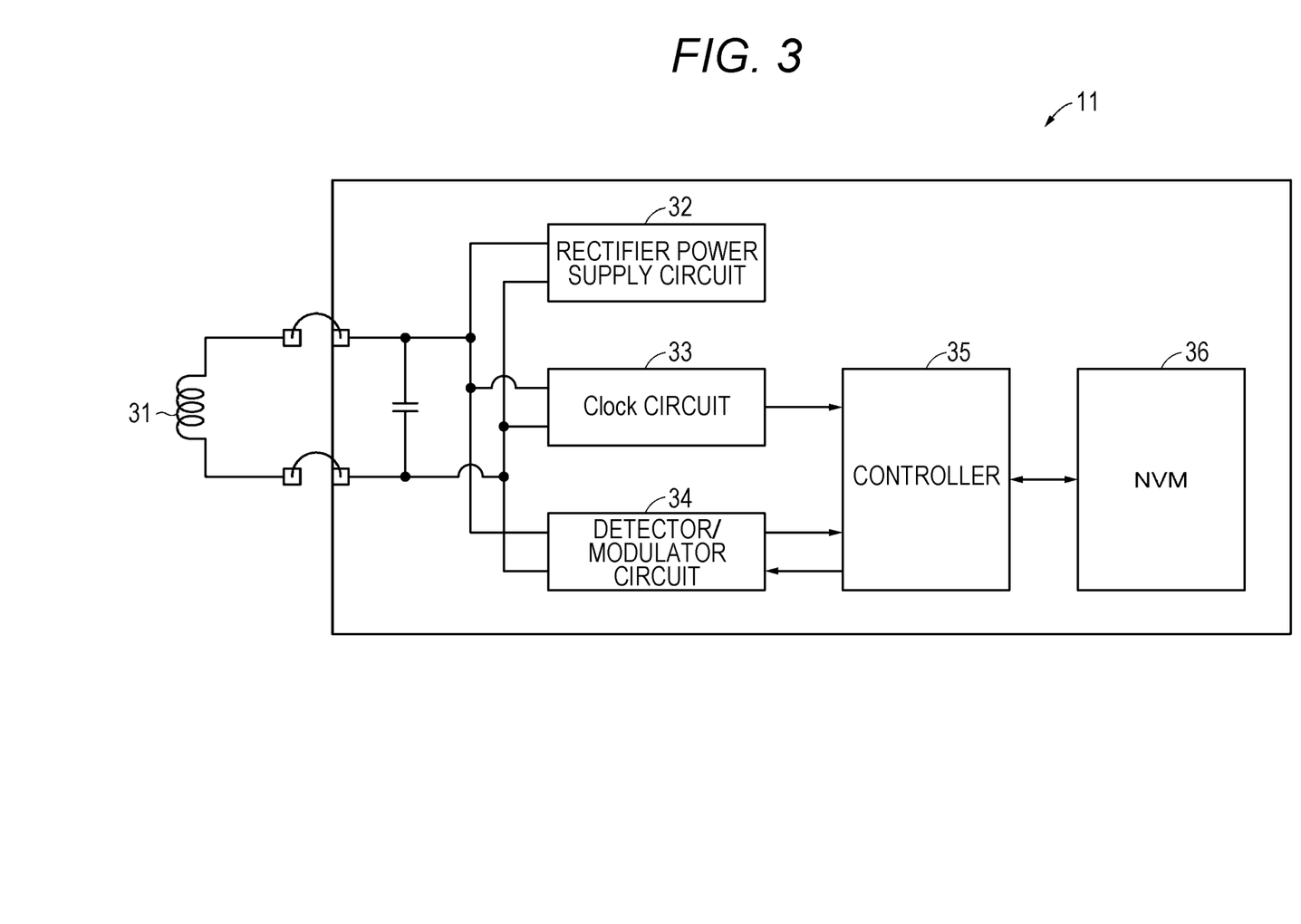
FIG. 3 is a block diagram of a cartridge memory.

The cartridge memory 11 used in the tape cartridge 10 includes, as illustrated in FIG. 3, an antenna coil 31, a rectifier power supply circuit 32 that generates power supply by generating and rectifying power using induced electromotive force from radio waves received by the antenna coil 31, a clock circuit 33 that generates a clock by also using the induced electromotive force from radio waves received by the antenna coil 31, a detector/modulator circuit 34 that detects radio waves received by the antenna coil 31 and modulates a signal to be transmitted by the antenna coil 31, a controller 35 that includes a logic circuit or the like for determining a command and data from a digital signal extracted from the detector/modulator circuit 34 and processing the command and data, and a non-volatile memory (NVM) 36.

The non-volatile memory 36 has a storage capacity exceeding 16 KB which is larger than the storage capacity defined by the LTO-8 or IBM 3592 magnetic tape standard. An electrically erasable programmable read-only memory (EEPROM) is typically used as the non-volatile memory 36, but a magnetoresistive random access memory (MRAM), a resistive random access memory (ReRAM), or the like may be used as well.

The cartridge memory 11 is configured such that the antenna coil 31 and detection/modulation conform to the ISO 14443-2 standard in the radio frequency (RF) band, and the command system conforms to the LTO 8 or IBM 3592 standard. According to these standards, the non-volatile memory 36 provided in the cartridge memory 11 can be accessed on a word-by-word basis (2 bytes at a time) or on a block-by-block basis (32 bytes at a time), where addressing can be performed using a 12-bit address in the word-by-word access or a 16-bit address in the block-by-block access. The usable memory capacity is 128 KB at the maximum in a case where an access is made on a word-by-word basis (2 bytes at a time), or is 2 MB at the maximum in a case where an access is made on a block-by-block basis (32 bytes at a time). These are the limitations on the capacity that can be realized in terms of specifications.

Figure 4:
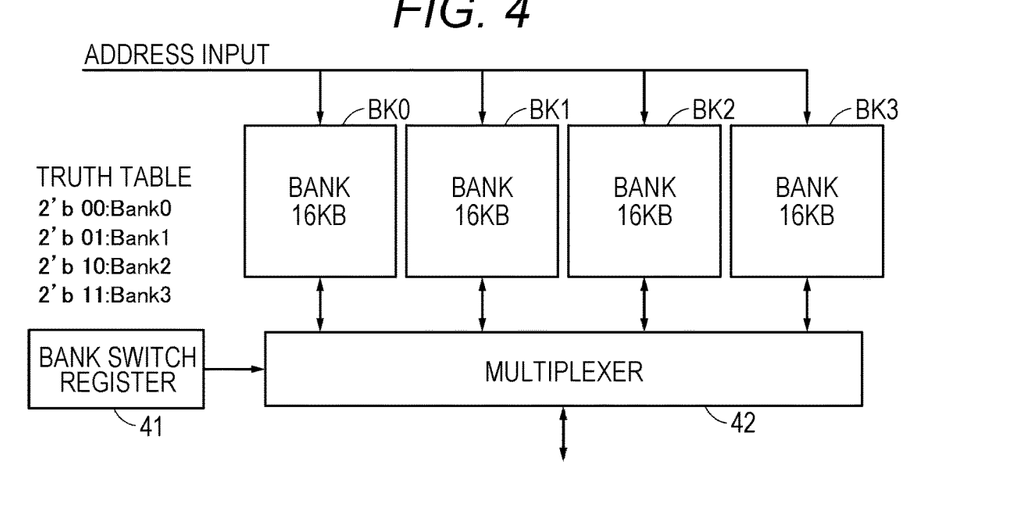
FIG. 4 is a block diagram of a non-volatile memory.

The cartridge memory 11 includes four banks BK0 to BK3, a bank switch register 41, and a multiplexer 42 as illustrated in FIG. 4. Although the four banks BK0 to BK3 are configured by four 16 KB memories in an example described herein, the number of banks is not limited to that of this example but can be selected at will as long as there are two or more banks irrespective of being an even number of banks or an odd number of banks.

The bank switch register 41 is for switching the banks BK0 to BK3 such that a bank to/from which data is to be written or read is any one of the banks BK0 to BK3. The bit length of the bank switch register 41 varies depending on the number of banks but needs only be 2 bits minimum in the case of four banks. In other words, it is sufficient if the switching can be controlled in the number of ways equal to a square of two ($2^2$), that is, in four ways, as a combination. For performing write to the bank switch register 41, for example, one word (2 bytes) being a minimum access unit is reserved, where 2 bits of the one word are allocated for bank switching. The one word for performing write to the bank switch register 41 is preferably allocated in a reserved area which is unused according to the LTO standard, for example, but may be allocated in any write protected area in the cartridge memory 11. The multiplexer 42 sets any of the banks BK0 to BK4 as a destination to which data is written in accordance with an input signal from the bank switch register 41.

Each of the banks BK0 to BK3 has a storage capacity of 128 KB or less, preferably 16 KB or more and 128 KB or less. The bank (first memory bank) BK0 corresponds to a storage area of an existing cartridge memory conforming to the LTO-8 or IBM 3592 standard. Normal data is written to the bank BK0. Here, the "normal data" means data defined in the LTO-8 or IBM 3592 standard.

The banks (second memory banks) BK1 to BK3 correspond to extended storage areas for the storage area of the existing cartridge memory described above. Additional data is written to the banks BK1 to BK3. Here, the additional data means data not defined in the LTO-8 or IBM 3592 standard. Examples of the additional data include management ledger data, a copy of the normal data written to the bank BK0, an error correction code of the normal data written to the bank BK0, index information, and the like but are not limited to these pieces of data.

The system controller 23 of the recording and reproducing device 20 requests the cartridge memory 11 to write or read the normal data. Specifically, the system controller 23 requests the controller 35 to switch the destination to/from which data is written or read from the bank BK1, the bank BK2, or the bank BK3 to the bank BK0, and then supplies the controller 35 with write or read of the normal data.

The system controller 23 of the recording and reproducing device 20 requests the cartridge memory 11 to write or read the additional data. Specifically, the system controller 23 requests the controller 35 to switch the destination to/from which data is written or read from the bank BK0 to the bank BK1, the bank BK2, or the bank BK3, and then supplies the controller 35 with write or read of the additional data.

In response to the request from the system controller 23 to change the bank to/from which data is to be written or read, the controller 35 of the cartridge memory 11 switches the destination to/from which data is written or read from the bank BK1, the bank BK2, or the bank BK3 to the bank BK0. Alternatively, the destination to/from which data is written or read is switched from the bank BK0 to the bank BK1, the bank BK2, or the bank BK3.

In response to the request from the system controller 23 to write or read the normal data, the controller 35 of the cartridge memory 11 writes the normal data to the bank BK0 or reads the normal data from the bank BK0. Furthermore, in response to the request from the system controller 23 to write or read the additional data, the additional data is written to the bank BK1, the bank BK2, or the bank BK3 or is read from the bank BK1, the bank BK2, or the bank BK3. Note that in writing the normal data and the additional data, the normal data and the additional data are supplied from the system controller 23 to the controller 35.

The system controller 23 and the controller 35 write or read data to/from the non-volatile memory on a word-by-word basis (2 bytes at a time) or on a block-by-block basis (32 bytes at a time).

[Operation of Recording and Reproducing System]

Figure 5:
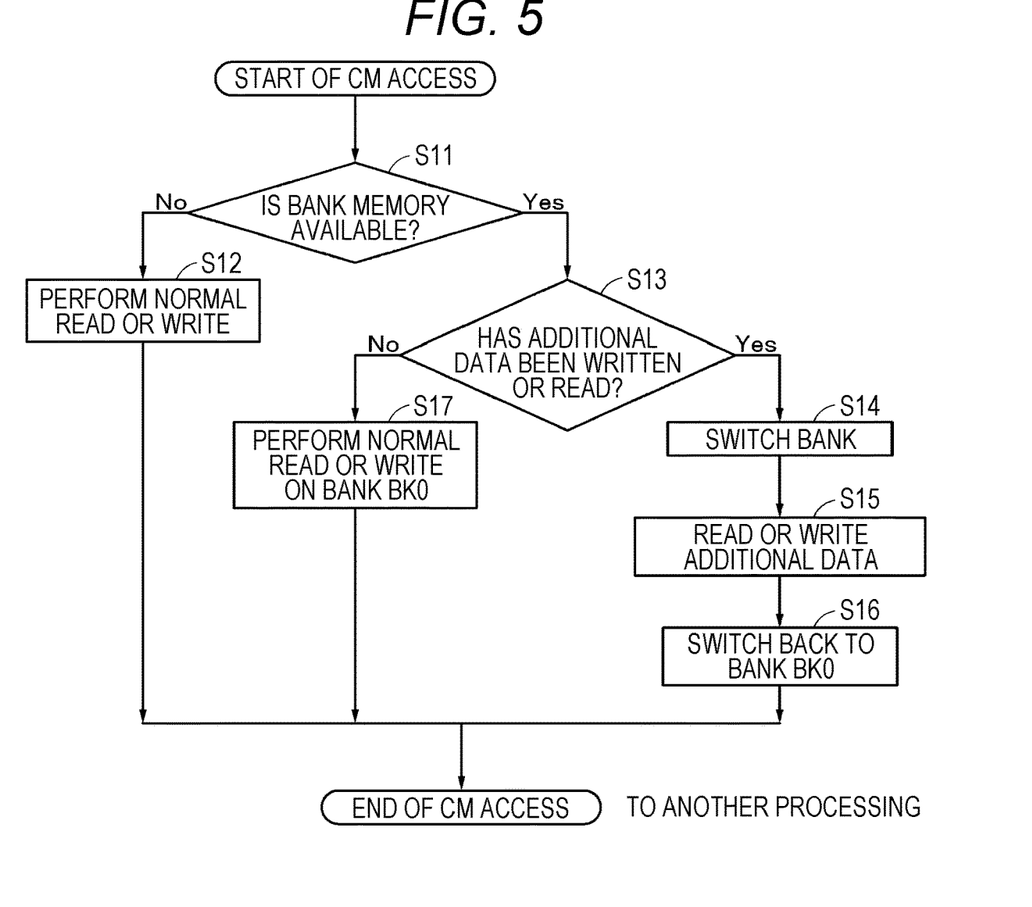
FIG. 5 is a flowchart for explaining an example of the operation of the recording and reproducing system according to the first embodiment of the present disclosure.

An example of the operation of the recording and reproducing system 100 according to the first embodiment of the present disclosure will be described below with reference to FIG. 5.

First, when the tape cartridge is loaded into the recording and reproducing device 20, for example, in step S11, the system controller 23 of the recording and reproducing device 20 inquires of the cartridge memory of the tape cartridge being loaded whether or not the cartridge memory has an extended storage area.

In a case where a response that the cartridge memory has the extended storage area is not returned from the cartridge memory in response to the inquiry of step S11, the system controller 23 determines that the cartridge memory is a general cartridge memory not having the extended storage area. On the other hand, in a case where a response that the cartridge memory has the extended storage area is returned from the cartridge memory, the system controller 23 determines that the cartridge memory is the cartridge memory 11 of the first embodiment having the extended storage area.

In the present specification, the "general cartridge memory" means a conventional cartridge memory conforming to the LTO-8 or IBM 3592 standard, that is, a cartridge memory having a storage capacity of 16 kB without an extended storage area. Furthermore, the extended storage area means a storage area exceeding 16 kB defined in the LTO-8 or IBM 3592 standard, that is, the memory space of the banks BK1 to BK3.

In a case where it is determined in step S11 that the tape cartridge has the general cartridge memory, the following write or read processing of the normal data is performed. That is, if the system controller 23 requests write or read of the normal data to a controller of the general cartridge memory, in step S22, the controller of the general cartridge memory writes the normal data supplied from the system controller 23 to the non-volatile memory or reads the normal data from the non-volatile memory and supplies the data to the system controller 23.

In a case where it is determined in step S11 that the cartridge memory is the cartridge memory 11, the following write or read processing of the normal data and additional data is performed. That is, in step S13, the system controller 23 first determines whether or not write or read processing of the additional data has been performed. In a case where it is determined in step S13 that the write or read processing of the additional data has been performed, the system controller 23 requests the controller 35 to change the destination to/from which data is written or read from the bank BK0 to the bank BK1 in step S14. The controller 35 having received this request changes the destination to/from which data is written or read from the bank BK0 to the bank BK1.

Next, in step S15, the system controller 23 requests the controller 35 to write or read the additional data. The controller 35 having received this request writes the additional data to the bank BK1 or reads the additional data from the bank BK1 and supplies the additional data read to the system controller 23.

Next, in step S16, the system controller 23 requests the controller 35 to change the destination to/from which data is written or read from the bank BK1 to the bank BK0. The controller 35 having received this request changes the destination to/from which data is written or read from the bank BK1 to the bank BK0.

In a case where it is determined in step S13 that the write or read processing of the additional data has not been performed but a request to write or read the normal data has been made, the controller 35 writes the normal data to the bank BK0 or reads the normal data from the bank BK0 and supplies the normal data read to the system controller 23 in step S17.

The normal data and the additional data are read when, for example, the tape cartridge 10 is loaded into the recording and reproducing device 20. On the other hand, the normal data and the additional data are written when, for example, the tape cartridge 10 is unloaded from the recording and reproducing device 20 or data is recorded on the magnetic tape MT.

Although the above operation describes the example in which the additional data is written to the bank BK1, the additional data may be written to the bank BK2 or bank BK3 which is the extended storage area other than the bank BK1. Furthermore, in a case where the additional data is so large that the storage capacity of the bank BK1 is insufficient, the additional data may be written across the banks BK1 and BK2, or across the banks BK1, BK2, and BK3.

[Effect]

In the recording and reproducing system 100 according to the first embodiment, the controller 35 performs the write or read processing of the normal data on the bank BK0 among the plurality of banks BK0 to BK3, and performs the write or read processing of the additional data on the bank BK1 among the plurality of banks BK0 to BK3. Therefore, the storage capacity can be improved while maintaining compatibility with the LTO-8 or IBM 3592 standard.

2 Second Embodiment

A second embodiment describes an example of writing, as the additional data, a copy of the normal data written in the bank BK0 or an error correction code of the normal data written in the bank BK0 to the extended storage area.

[Configuration of Recording and Reproducing Tape System]

A copy of the normal data written in the bank BK0 (additional data) or an error correction code of the normal data written in the bank BK0 (additional data) is written to the bank BK1 which is the extended storage area.

After the normal data is written to the bank BK0, the system controller 23 requests the controller 35 to write a copy of the normal data or an error correction code of the normal data to the bank BK1, the bank BK2, or the bank BK3. In response to this request, the controller 35 writes the copy of the normal data or the error correction code of the normal data to the bank BK1, the bank BK2, or the bank BK3.

In a case where the normal data is read from the bank BK0 and supplied from the cartridge memory 11 to the system controller 23, the system controller 23 determines whether or not the normal data supplied is broken. The determination as to whether or not the data read from the bank BK0 is broken is made by using, for example, an error detecting code included in the normal data supplied from the cartridge memory 11. Note that the LTO standard defines that a cyclic redundancy check (CRC) is used as the error detecting code.

In a case where the system controller 23 determines that the normal data is not broken, the system controller supplies the normal data to the external computer 200, for example. On the other hand, in a case where the system controller 23 determines that the normal data is broken, the system controller requests the cartridge memory 11 to read the copy of the normal data or the error correction code of the normal data written in the bank BK1, the bank BK2, or the bank BK3. In response to this request, the controller 35 reads the copy of the normal data or the error correction code of the normal data from the bank BK1, the bank BK2, or the bank BK3, and makes a request to the system controller 23.

[Operation of Recording and Reproducing Tape System]

Figure 6:
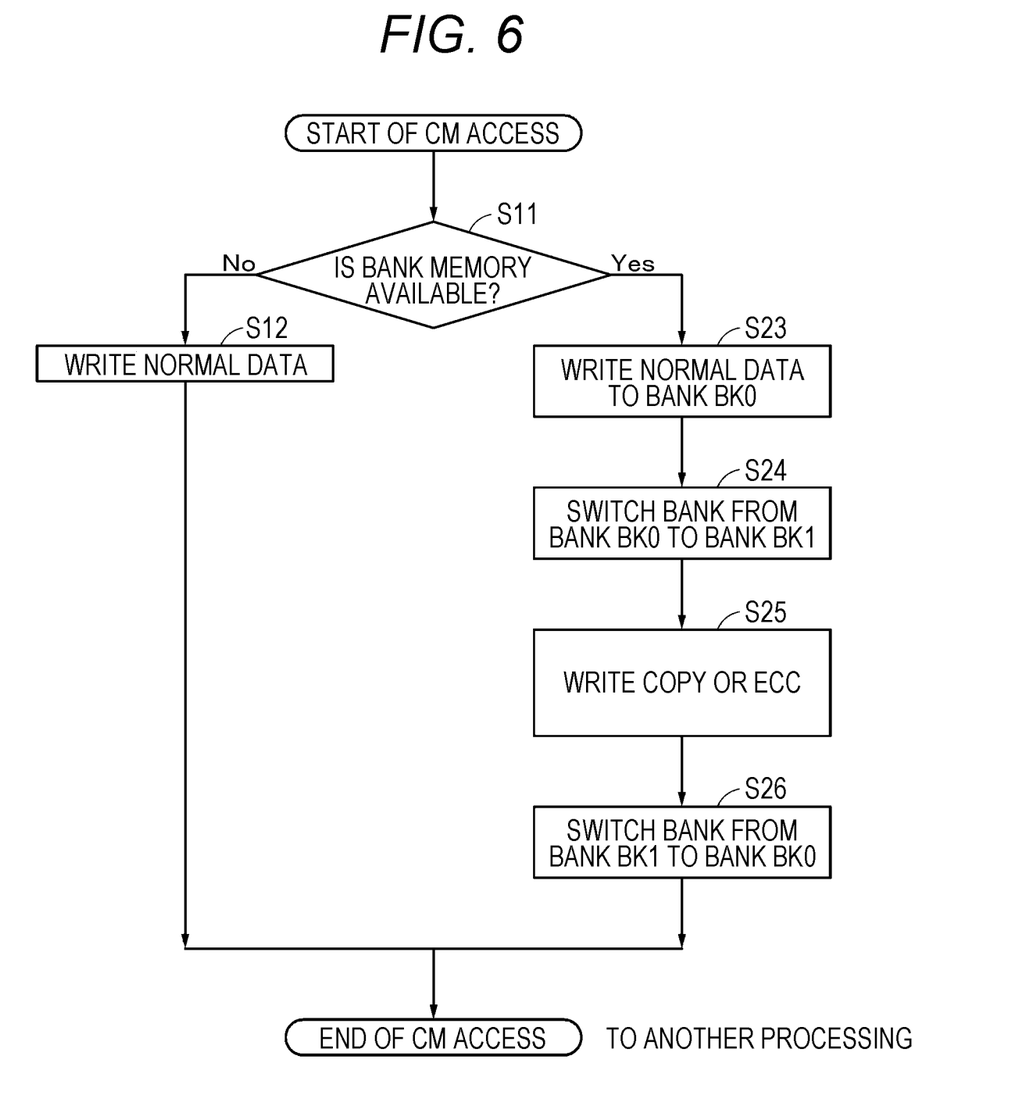
FIG. 6 is a flowchart for explaining an example of the operation of a recording and reproducing system according to a second embodiment of the present disclosure.

An example of the operation of the recording and reproducing system 100 according to the second embodiment of the present disclosure will be described below with reference to FIG. 6. Note that a step similar to that in the operation of the recording and reproducing system 100 of the first embodiment is indicated by the same reference numeral as that in the operation of the first embodiment and will not be described.

In a case where it is determined in step S11 that the cartridge memory is the cartridge memory 11 according to the second embodiment, the following write processing of the normal data and additional data is performed. That is, in step S23, the system controller 23 first supplies the normal data to the controller 35. The controller 35 writes the normal data supplied from the system controller 23 to the bank BK0.

Next, in step S24, the system controller 23 requests the controller 35 to switch the destination to which data is written from the bank BK0 corresponding to the storage area of an existing cartridge memory to the bank BK1 corresponding to the extended storage area. In response to this request, the controller 35 switches the destination to which data is written from the bank BK0 to the bank BK1.

Next, in step S25, the system controller 23 supplies the controller 35 with a copy of the normal data written to the bank BK0 in step S23 or an error correction code of the normal data written to the bank BK0 in step S23. The controller 35 writes the copy of the normal data or the error correction code of the normal data supplied from the system controller 23 to the bank BK1.

Next, in step S26, the system controller 23 requests the controller 35 to switch the destination to/from which data is written or read from the bank BK1 to the bank BK0. In response to this request, the controller 35 switches the destination to/from which data is written or read from the bank BK1 to the bank BK0. The destination to/from which data is written or read is switched to the bank BK0 as described herein so that, in a case where the tape cartridge 10 is loaded into a general recording and reproducing device, the general recording and reproducing device can perform write or read processing of normal data on the tape cartridge 10 as it does on a general cartridge.

Here, the "general recording and reproducing device" means a conventional recording and reproducing device that can write or read data to/from the storage area of an existing cartridge memory (that is, the 16 kB storage area (bank BK0) defined by the LTO-8 or IBM 3592 standard) but cannot write or read data to/from the extended storage area (banks BK1 to BK3).

Although the above operation describes the example in which the copy of the normal data or the error correction code of the normal data is written to the bank BK1, the copy of the normal data or the error correction code thereof may be written to the bank BK2 or the bank BK3.

[Effect]

In the recording and reproducing system 100 according to the second embodiment, the system controller 23 of the recording and reproducing device 20 writes the copy of the normal data or the error correction code of the normal data written in the bank BK0 to the bank BK1 which is the extended storage area. Thus, in a case where the normal data read from the bank BK0 is found to be broken, the system controller 23 can read the copy of the normal data or the error correction code of the normal data from the bank BK1.

As a result, the broken normal data can be restored so that the reliability of the write data can be improved.

3 Third Embodiment

A third embodiment describes an example of writing management ledger data to the extended storage area or reading management ledger data from the extended storage area.

[Configuration of Recording and Reproducing Tape System]

Management ledger data (additional data) defined in JIS Z-6019 is written to the bank BK1 which is the extended storage area. Although an example of writing the management ledger data to the bank BK1 is described herein, the management ledger data may be written to the bank BK2 or the bank BK3 which is the extended storage area other than the bank BK1. Furthermore, in a case where the management ledger data is so large that the storage capacity of the bank BK1 is insufficient, the management ledger data may be written across the banks BK1 and BK2, or across the banks BK1, BK2, and BK3.

The system controller 23 of the recording and reproducing device 20 requests the cartridge memory 11 to write or read the management ledger data. Specifically, the system controller 23 requests the controller 35 to switch the destination to/from which data is to be written or read from the bank BK0 to the bank BK1, and then requests the controller 35 to write or read the management ledger data. The management ledger data is written when, for example, the tape cartridge 10 is unloaded from the recording and reproducing device 20 or the like. The management ledger data is read when, for example, the tape cartridge 10 is loaded into the recording and reproducing device 20 or the like.

In response to the request from the system controller 23, the controller 35 of the cartridge memory 11 switches the destination to/from which data is written or read from the bank BK0 to the bank BK1. Furthermore, in response to the request from the system controller 23, the management ledger data is written to the bank BK1 or is read from the bank BK1 and supplied to the system controller 23.

[Operation of Recording and Reproducing Tape System]

Figure 7:
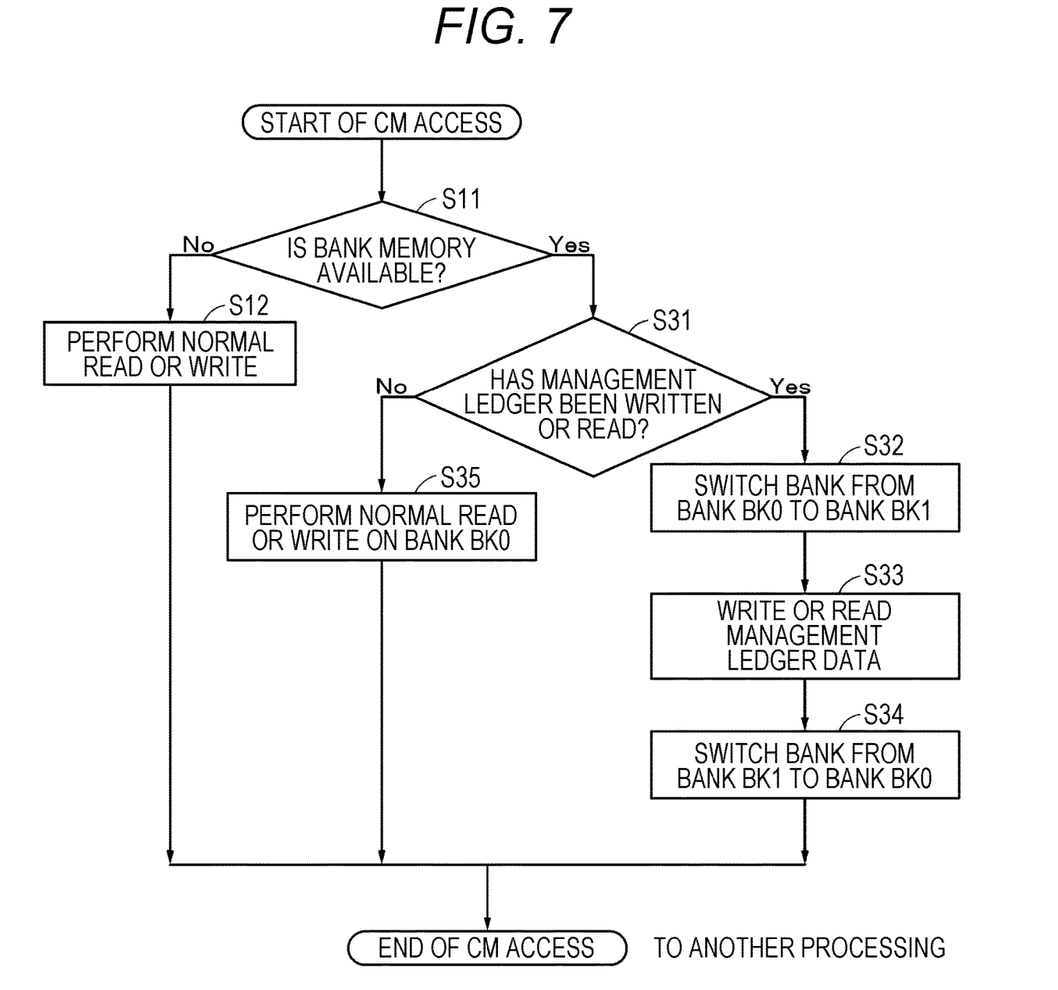
FIG. 7 is a flowchart for explaining an example of the operation of a recording and reproducing system according to a third embodiment of the present disclosure.

An example of the operation of the recording and reproducing system 100 according to the third embodiment will be described below with reference to FIG. 7. Note that a step similar to that in the operation of the recording and reproducing system 100 of the first embodiment is indicated by the same reference numeral as that in the operation of the first embodiment and will not be described.

In a case where it is determined in step S11 that the cartridge memory is the cartridge memory 11 according to the third embodiment, the following write or read processing of data is performed.

First, in step S31, the system controller 23 determines whether or not write or read processing of a deposit ledger has been performed. In a case where it is determined in step S31 that the write or read processing of the deposit ledger has been performed, the system controller 23 requests the controller 35 to change the destination to/from which data is written or read from the bank BK0 to the bank BK1 in step S32. The controller 35 having received this request changes the destination to/from which data is written or read from the bank BK0 to the bank BK1.

Next, in step S33, the system controller 23 requests the controller 35 to write or read the management ledger data. The controller 35 having received this request writes the management ledger data to the bank BK1 or reads the management ledger data from the bank BK1.

Next, in step S34, the system controller 23 requests the controller 35 to change the destination to/from which data is written or read from the bank BK1 to the bank BK0. The controller 35 having received this request changes the destination to/from which data is written or read from the bank BK1 to the bank BK0.

In a case where it is determined in step S31 that the write or read processing of the deposit ledger has not been performed but normal read or write processing has been requested, the controller 35 writes the normal data to the bank BK0 or reads the normal data from the bank BK0 in step S35.

[Effect]

The recording and reproducing system 100 according to the third embodiment can switch the bank switch register 41 and write the management ledger data to the bank BK1 or the like which is the extended storage area. Therefore, a search of the management ledger data can be sped up compared to a case where the management ledger data is written on the magnetic tape MT.

On the other hand, in a case where the management ledger data is not to be written, the normal data can be written to the bank BK0 or read from the bank BK0. Therefore, the bank BK0 can be treated as a non-volatile memory of a normal cartridge memory.

The JIS Z-6019 defines that the management ledger data is to be written in a storage for file management, where the management ledger data is required for each file to be managed. As the capacity of the magnetic tape increases, the number of files that can be written also increases so that the storage capacity of 16 KB established by LTO-8 is insufficient. Thus, a conventional recording and reproducing system needs to record the management ledger data on the magnetic tape simultaneously with a file, and also needs to access the magnetic tape each time the management ledger data is to be accessed. Therefore, a search for necessary information is performed after all information stored on the magnetic tape is read, whereby the magnetic tape that reads data not electrically but physically has a problem that the search takes time.

4 Fourth Embodiment

A fourth embodiment describes an example of writing index information to the extended storage area or reading index information from the extended storage area.

[Configuration of Recording and Reproducing Tape System]

Index information is written to the bank BK1 which is the extended storage area. The index information is a management table (additional data) for managing a file system. The file system is a Liner Tape File System (LTFS), for example.

Although an example of writing the index information to the bank BK1 is described herein, the index information may be written to the bank BK2 or BK3 which is the extended storage area other than the bank BK1. Furthermore, in a case where the index information is so large that the storage capacity of the bank BK1 is insufficient, the index information may be written across the banks BK1 and BK2, or across the banks BK1, BK2, and BK3.

The system controller 23 of the recording and reproducing device 20 requests the cartridge memory 11 to write or read the index information. Specifically, the system controller 23 requests the controller 35 to switch the destination to/from which data is written or read from the bank BK0 to the bank BK1, and then requests the controller 35 to write or read the index information. The index information is read when, for example, the tape cartridge 10 is loaded into the recording and reproducing device 20 or the like. The index information is written when, for example, data is recorded on the magnetic tape MT or the like.

In response to the request from the system controller 23, the controller 35 of the cartridge memory 11 switches the destination to/from which data is written or read from the bank BK0 to the bank BK1. Furthermore, in response to the request from the system controller 23, the index information is written to the bank BK1 or read from the bank BK1.

[Operation of Recording and Reproducing Tape System]

Figure 8:
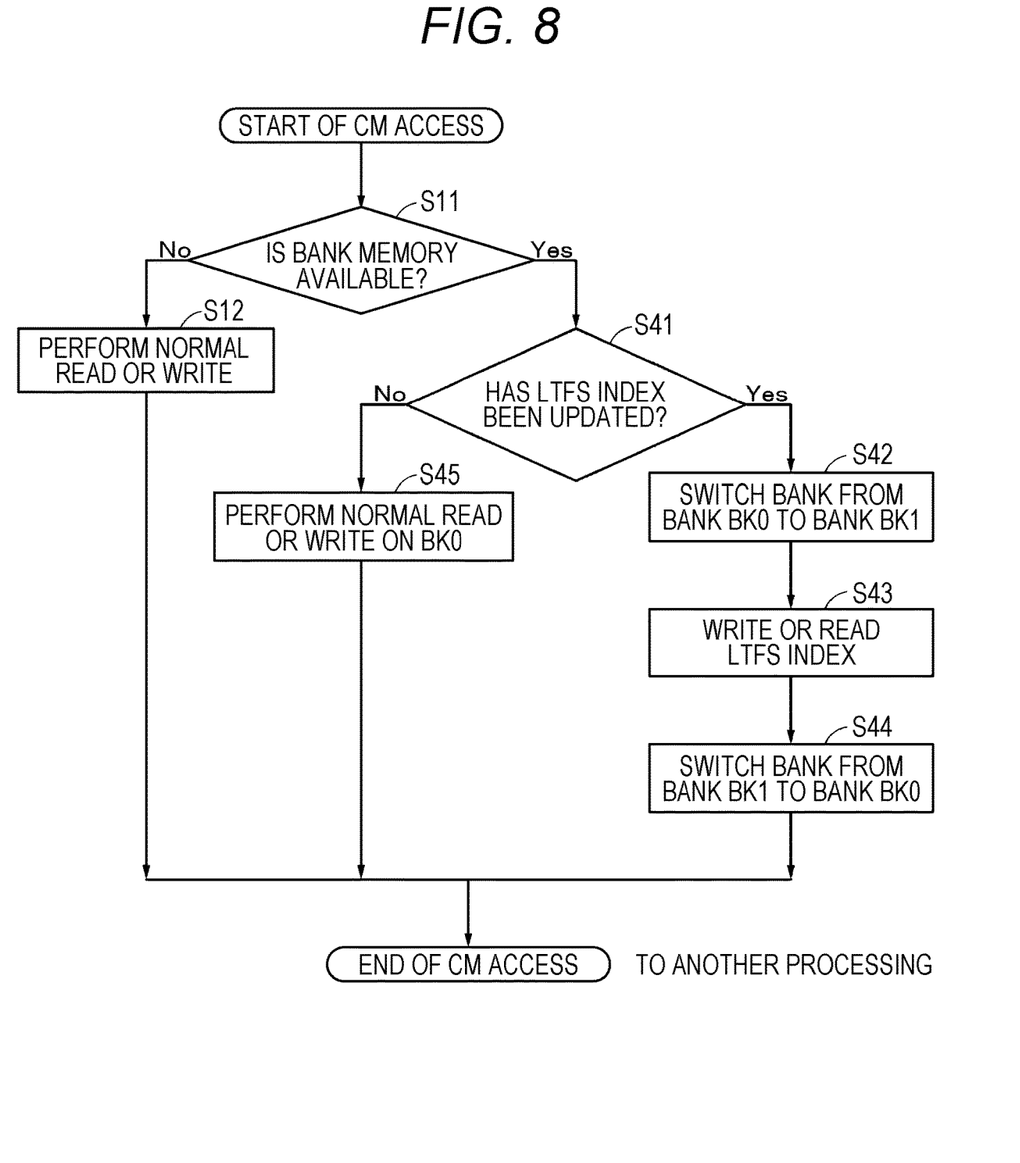
FIG. 8 is a flowchart for explaining an example of the operation of a recording and reproducing system according to a fourth embodiment of the present disclosure.

An example of the operation of the recording and reproducing system 100 according to the fourth embodiment will be described below with reference to FIG. 8. Note that a step similar to that in the operation of the recording and reproducing system 100 of the first embodiment is indicated by the same reference numeral as that in the operation of the first embodiment and will not be described.

In a case where it is determined in step S11 that the cartridge memory is the cartridge memory 11 according to the fourth embodiment, the following write or read processing of data is performed.

First, in step S41, the system controller 23 determines whether or not write or read processing of the index information has been performed. In a case where it is determined in step S41 that the write or read processing of the index information has been performed, the system controller 23 requests the controller 35 to change the destination to/from which data is written or read from the bank BK0 to the bank BK1 in step S42. The controller 35 having received this request changes the destination to/from which data is written or read from the bank BK0 to the bank BK1.

Next, in step S43, the system controller 23 requests the controller 35 to write or read the index information. The controller 35 having received this request writes the index information to the bank BK1 or reads the index information from the bank BK1.

Next, in step S44, the system controller 23 requests the controller 35 to change the destination to/from which data is written or read from the bank BK1 to the bank BK0. The controller 35 having received this request changes the destination to/from which data is written or read from the bank BK1 to the bank BK0.

In a case where it is determined in step S41 that the write or read processing of the index information has not been performed but a request to write or read the normal data has been made, the controller 35 writes the normal data to the bank BK0 or reads the normal data from the bank BK0 in step S45.

[Effect]

In the LTFS specification, the magnetic tape is divided into partitions so that about 4% of the capacity of the magnetic tape is reserved for writing LTFS index information. The magnetic tape, by its nature, is suitable for sequential access but not for random access. Data is written additionally even in a case where a file is updated, and the file before the update is not deleted but only invalidated. The accompanying LTFS index information is also added repeatedly on an LTFS index partition. Therefore, in order to access a certain file, it is necessary to search the LTFS index partition and look for the latest index information on the magnetic tape. Due to this operation, a conventional recording and reproducing system has a problem that the speed of the tape system using LTFS is slow. Furthermore, in order to achieve some speed-up, a tape library vendor recommends an option that achieves speed-up by causing the cartridge memory to store the location on the tape with the latest LTFS index information within the limitation of the capacity of the cartridge memory (16 KB for LTO8).

The recording and reproducing system 100 according to the fourth embodiment is configured to write the index information only to the cartridge memory 11 suitable for random access, not to the magnetic tape MT. Therefore, more data can be written to the magnetic tape MT since the partition of about 4% thereof described above become unnecessary. Furthermore, in updating the index information, it is only required to overwrite existing index information without the need for additional write, so that the latest index information can always be accessed at high speed and that the recording and reproducing system 100 can be sped up.

<5 Variation>

Although the first to fourth embodiments of the present disclosure have been described in detail above, the present disclosure is not limited to the above first to fourth embodiments but can be modified in various ways based on the technical ideas of the present disclosure.

For example, the configurations, methods, steps, numerical values, and the like described in the first to fourth embodiments above are merely examples, and configurations, methods, steps, numerical values, and the like different therefrom may be used as necessary.

Furthermore, the configurations, methods, steps, numerical values, and the like of the first to fourth embodiments above can be combined with one another without departing from the spirit of the present disclosure.

Although the first to fourth embodiments above describe the example of configuring the bank memory with the four banks BK0 to BK3 using four 16 KB memories, the configuration of the bank memory is not limited thereto.

Figure 9:
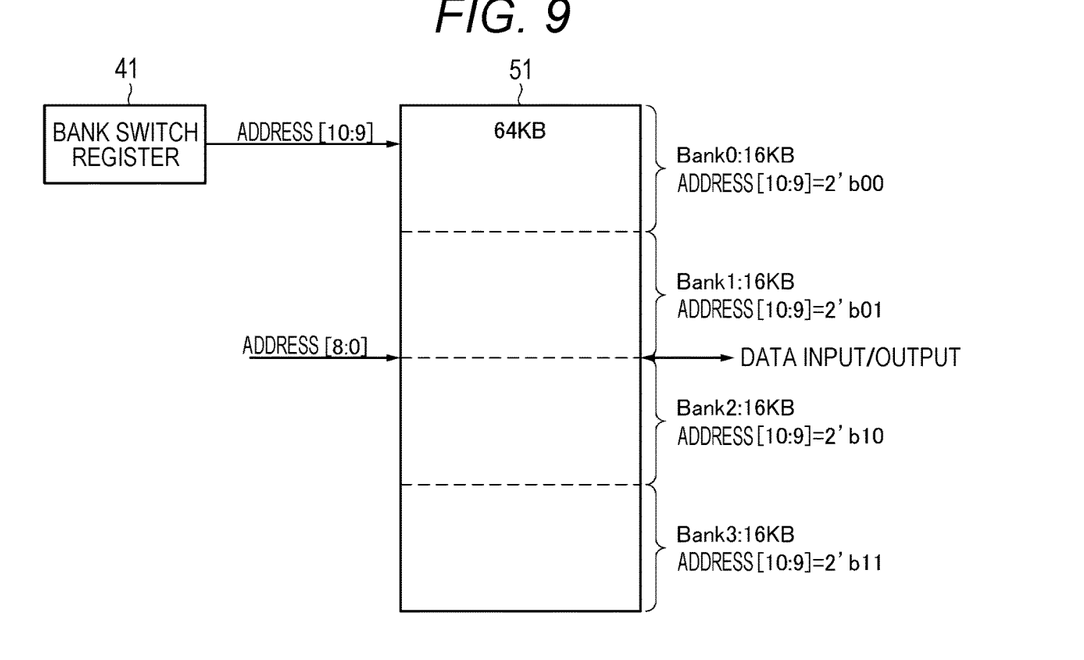
FIG. 9 is a block diagram of a variation of a non-volatile memory.

For example, as illustrated in FIG. 9, an apparent four-bank memory may be configured by using a memory 51 with the storage capacity of 64 KB and dividing the 64 KB memory into four using, for example, upper two address bits of each word. Alternatively, although not shown in the drawing, an apparent four-bank memory may be configured by using two memories each with the storage capacity of 32 KB and similarly dividing each 32 KB memory into two. Also, the bank switch address is not limited to the upper two bits but may be allocated anywhere.

Figure 10:
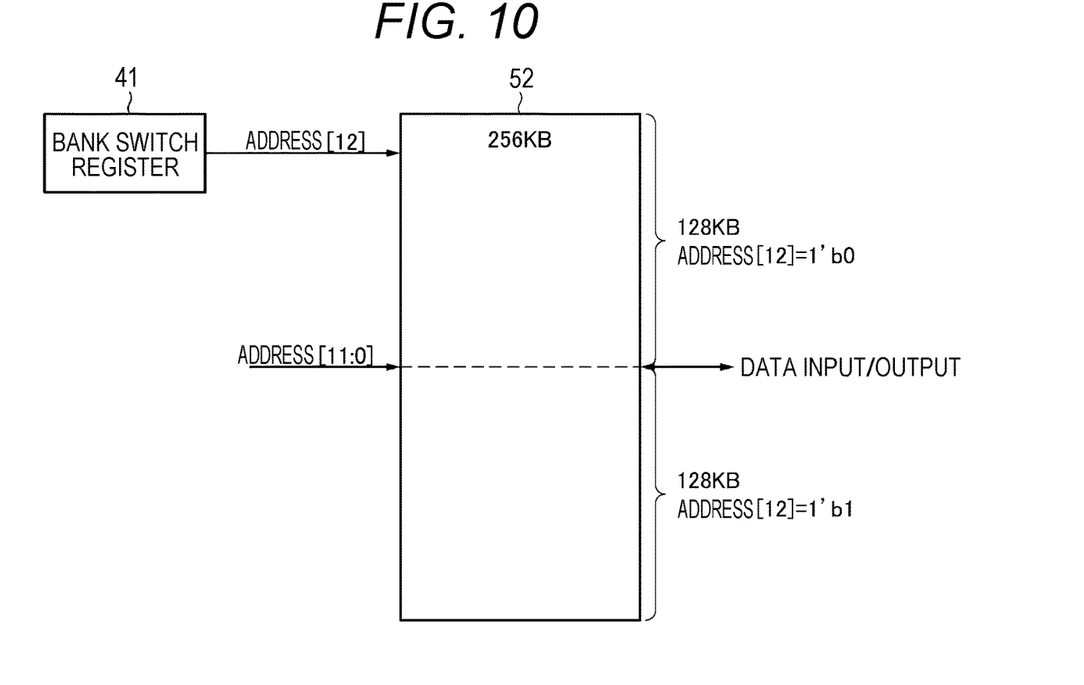
FIG. 10 is a block diagram of a variation of a non-volatile memory.

Furthermore, as illustrated in FIG. 10, a two-bank memory with each bank having 128 KB may be configured by using a memory 52 with the storage capacity of 256 KB. In the ISO 14443-2 standard, two access methods being word-by-word access and block-by block access can be selected, where addressing is performed with the address width of 12 bits for the word-by-word access and 16 bits for the block-by-block access. The 12-bit address width becomes a constraint for enabling access both on a word-by-word basis and a block-by-block basis so that only the capacity of 128 KB can be realized, but the present variation can extend the capacity up to 256 KB for use.

The first to fourth embodiments above describe the case where the system controller 23 and the controller 35 write or read data to/from the non-volatile memory 36 on a word-by-word basis (2 bytes at a time) or on a block-by-block basis (32 bytes at a time), but the system controller 23 and the controller 35 may write or read data to/from the non-volatile memory 36 on a block-by-block basis (32 bytes at a time). In this case, each of the banks BK0 to BK3 has the storage capacity of 2 MB or less, preferably 16 KB or more and 2 MB or less.

The first to fourth embodiments above describe the case where each of the plurality of banks included in the non-volatile memory 36 has the storage capacity of 16 KB or more than or equal to 16 KB, but each of the plurality of banks included in the non-volatile memory 36 may have the storage capacity of less than 16 KB. Specifically, each of the plurality of banks included in the non-volatile memory 36 may have the storage capacity of (16/n) KB (where "n" is a positive integer), for example, 8 KB. In this case, the normal data is written across a plurality of banks (first memory banks) with the storage capacity of 16 KB in total. For example, in a case where each of the plurality of banks included in the non-volatile memory 36 has the storage capacity of 8 KB, the normal data is written across two banks (first memory banks).

Although the first to fourth embodiments above describe the case where the present disclosure is applied to the recording and reproducing device, the present disclosure is not limited thereto but may be applied to a library apparatus, a storage system, or the like.

Furthermore, the present disclosure can also adopt the following configurations.

(1)
A cartridge memory used for a tape cartridge, including:
a communication unit that communicates with a recording and reproducing device using a wireless communication method defined by an ISO 14443-2 standard which is a wireless communication standard;
a non-volatile memory with a storage capacity exceeding 16 KB; and
a control unit that writes or reads data to or from the non-volatile memory on a word-by-word basis (2 bytes at a time) or on a block-by-block basis (32 bytes at a time), in which
the non-volatile memory includes a plurality of memory banks each having a storage capacity of 128 KB or less,
the control unit writes or reads data defined by a magnetic tape standard to or from one or two or more first memory banks among the plurality of the memory banks, and
additional data is written or read to or from one or two or more second memory banks other than the first memory bank.

(2)
A cartridge memory used for a tape cartridge, including:
a communication unit that communicates with a recording and reproducing device using a wireless communication method defined by an ISO 14443-2 standard which is a wireless communication standard;
a non-volatile memory with a storage capacity exceeding 16 KB; and
a control unit that writes or reads data to or from the non-volatile memory on a block-by-block basis (32 bytes at a time), in which
the non-volatile memory includes a plurality of memory banks each having a storage capacity of 2 MB or less,
the control unit writes or reads data defined by a magnetic tape standard to or from one or two or more first memory banks among the plurality of the memory banks, and
additional data is written or read to or from one or two or more second memory banks other than the first memory bank.

(3)
The cartridge memory according to (1), in which the memory bank has a storage capacity of 16 KB or more and 128 KB or less.

(4)
The cartridge memory according to (2), in which the memory bank has a storage capacity of 16 KB or more and 2 MB or less.

(5)
The cartridge memory according to any one of (1) to (4), in which the additional data is management ledger data defined in JIS 26019.

(6)
The cartridge memory according to any one of (1) to (4), in which the additional data is a management table for managing a file system.

(7)
The cartridge memory according to (6), in which the file system is a linear tape file system.

(8)
The cartridge memory according to any one of (1) to (4), in which the additional data is a copy or an error correction code of data written to the first memory bank.

(9)
The cartridge memory according to any one of (1) to (8), in which the non-volatile memory further includes a memory bank switch register for switching the plurality of the memory banks.

(10)
A tape cartridge including the cartridge memory according to any one of (1) to (9).

(11)
A recording and reproducing system including:
a tape cartridge including the cartridge memory according to any one of (1) to (9); and
a recording and reproducing device that can load or unload the tape cartridge.

REFERENCE SIGNS LIST

10 Tape cartridge
11 Cartridge memory
20 Recording and reproducing device
21 Reader/writer
22 Recording and reproducing unit
23 System controller
24 Interface
31 Antenna coil
32 Rectifier power supply circuit
33 Clock circuit
34 Detector/modulator circuit
35 Controller
36 Non-volatile memory
41 Bank switch register
42 Multiplexer
100 Recording and reproducing system
200 External computer
BK0 Bank (first memory bank)
BK1 to BK3 Bank (second memory bank)
MT Magnetic tape

The invention claimed is:
1. A cartridge memory used for a tape cartridge, comprising:
a communication unit that communicates with a recording and reproducing device using a wireless communication method defined by an ISO 14443-2 standard which is a wireless communication standard;
a non-volatile memory with a storage capacity exceeding 16 KB; and a control unit that writes or reads data to or from the non-volatile memory on a word-by-word basis (2 bytes at a time) or on a block-by-block basis (32 bytes at a time), wherein the non-volatile memory includes a plurality of memory banks each having a storage capacity of 128 KB or less, the control unit writes or reads data defined by a magnetic tape standard to or from one or two or more first memory banks among the plurality of the memory banks, and additional data is written or read to or from one or two or more second memory banks other than the first memory bank.

2. A cartridge memory used for a tape cartridge, comprising:

a communication unit that communicates with a recording and reproducing device using a wireless communication method defined by an ISO 14443-2 standard which is a wireless communication standard;

a non-volatile memory with a storage capacity exceeding 16 KB; and a control unit that writes or reads data to or from the non-volatile memory on a block-by-block basis (32 bytes at a time), wherein the non-volatile memory includes a plurality of memory banks each having a storage capacity of 2 MB or less, the control unit writes or reads data defined by a magnetic tape standard to or from one or two or more first memory banks among the plurality of the memory banks, and additional data is written or read to or from one or two or more second memory banks other than the first memory bank.

3. The cartridge memory according to claim 1, wherein the memory bank has a storage capacity of 16 KB or more and 128 KB or less.

4. The cartridge memory according to claim 2, wherein the memory bank has a storage capacity of 16 KB or more and 2 MB or less.

5. The cartridge memory according to claim 1, wherein the additional data is management ledger data defined in JIS Z6019.

6. The cartridge memory according to claim 1, wherein the additional data is a management table for managing a file system.

7. The cartridge memory according to claim 6, wherein the file system is a linear tape file system.

8. The cartridge memory according to claim 1, wherein the additional data is a copy or an error correction code of data written to the first memory bank.

9. The cartridge memory according to claim 1, wherein the non-volatile memory further comprises a memory bank switch register for switching the plurality of the memory banks.

10. A tape cartridge comprising the cartridge memory according to claim 1.

11. A recording and reproducing system comprising:
a tape cartridge including the cartridge memory according to claim 1; and
a recording and reproducing device that can load or unload the tape cartridge.

12. A tape cartridge comprising the cartridge memory according to claim 2.

13. A recording and reproducing system comprising:
a tape cartridge including the cartridge memory according to claim 2; and
a recording and reproducing device that can load or unload the tape cartridge.

* * * * *